(12) United States Patent
Svensson

(10) Patent No.: US 10,239,510 B2
(45) Date of Patent: Mar. 26, 2019

(54) METHOD FOR CONTROLLING A HYDRAULIC BRAKE SYSTEM OF A MOTOR VEHICLE

(71) Applicant: Ford Global Technologies, LLC, Dearborn, MI (US)

(72) Inventor: Thomas Svensson, Leichlingen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/990,489

(22) Filed: Jan. 7, 2016

(65) Prior Publication Data

US 2016/0200309 A1    Jul. 14, 2016

(30) Foreign Application Priority Data

Jan. 8, 2015  (DE) .................. 10 2015 200 106

(51) Int. Cl.
| | | |
|---|---|---|
| *B60T 13/74* | (2006.01) | |
| *B60T 8/172* | (2006.01) | |
| *B60T 13/68* | (2006.01) | |
| *B60T 7/04* | (2006.01) | |
| *B60T 13/66* | (2006.01) | |
| *B60T 8/32* | (2006.01) | |
| *B60T 8/48* | (2006.01) | |

(52) U.S. Cl.
CPC ............ *B60T 13/745* (2013.01); *B60T 7/042* (2013.01); *B60T 8/172* (2013.01); *B60T 8/3275* (2013.01); *B60T 8/4845* (2013.01); *B60T 13/662* (2013.01); *B60T 13/686* (2013.01); *B60T 2201/03* (2013.01)

(58) Field of Classification Search
CPC .... B60T 13/745; B60T 13/662; B60T 13/686; B60T 7/042; B60T 8/172; B60T 8/3275; B60T 2201/03
USPC ....................................... 303/113.4
See application file for complete search history.

(56) References Cited

U.S. PATENT DOCUMENTS

| | | | | |
|---|---|---|---|---|
| 5,941,609 A | * | 8/1999 | Wagner ............... | B60T 8/3275 303/113.4 |
| 6,048,039 A | * | 4/2000 | Eckert ................. | B60T 8/367 303/113.4 |
| 6,805,037 B2 | * | 10/2004 | Hoffmann ............ | B60T 13/57 91/1 |
| 9,037,374 B2 | * | 5/2015 | Foitzik ................ | B60T 7/042 701/70 |
| 9,061,673 B2 | * | 6/2015 | Weiberle ............. | B60T 7/042 |
| 9,227,611 B2 | * | 1/2016 | Gilles ................. | B60T 8/3275 |

(Continued)

*Primary Examiner* — Thomas W Irvin
(74) *Attorney, Agent, or Firm* — Raymond L. Coppiellie; Burgess Law Office, PLLC

(57) ABSTRACT

A method of controlling a brake system of a motor vehicle having a braking assistance function. The brake system including a master brake cylinder, activated with a brake pedal. A distance s between a valve piston connected to the brake pedal, and a transmission element, connected to a pressure piston of the master brake cylinder is sensed and the brake system is controlled as a function of the sensed distance s. Within the scope of this monitoring process, brake pedal release is detected even when the pressure-generating unit is activated. In addition, despite an active braking assistance function, consistent interplay occurs between activation by the driver and assistance-side activation of the brakes given satisfactory pedal feedback.

15 Claims, 2 Drawing Sheets

(56) References Cited

U.S. PATENT DOCUMENTS

| | | | |
|---|---|---|---|
| 9,254,827 B2* | 2/2016 | Weiberle | B60T 1/10 |
| 9,340,191 B2* | 5/2016 | Yang | B60T 13/588 |
| 9,428,169 B2* | 8/2016 | Zhang | B60T 13/745 |
| 9,505,390 B2* | 11/2016 | Richard | B60T 13/745 |
| 2004/0079222 A1 | 4/2004 | Hoffmann et al. | |
| 2006/0163941 A1* | 7/2006 | Von Hayn | B60T 7/042 |
| | | | 303/155 |
| 2012/0091788 A1* | 4/2012 | Weiberle | B60T 7/042 |
| | | | 303/15 |
| 2012/0193974 A1* | 8/2012 | Birkheim | B60T 8/4275 |
| | | | 303/10 |
| 2014/0041378 A1 | 2/2014 | Richard et al. | |
| 2014/0214297 A1* | 7/2014 | Foitzik | B60T 7/042 |
| | | | 701/70 |
| 2015/0197230 A1* | 7/2015 | Kolarsky | B60T 8/3265 |
| | | | 701/70 |
| 2016/0107628 A1* | 4/2016 | Mahnkopf | B60T 13/745 |
| | | | 303/115.2 |

* cited by examiner

METHOD FOR CONTROLLING A HYDRAULIC BRAKE SYSTEM OF A MOTOR VEHICLE

CROSS-REFERENCE TO RELATED APPLICATIONS

Not Applicable

BACKGROUND OF THE INVENTION

1. Field of the Invention

The invention relates to a method for controlling a hydraulic brake system of a motor vehicle equipped with a braking assistance function, and to a hydraulic brake system of this type.

2. Description of Related Art

Brake systems of motor vehicles are generally hydraulic brake systems. In this context, a master brake cylinder generates a pressure by shifting a pressure piston, connected directly or indirectly to a brake pedal, in a pressure chamber filled with brake fluid. The pressure passed on to at least one wheel brake cylinder via hydraulic lines. The wheel brake cylinder moves brake linings, bearing, for example, against brake shoes owing to the pressure of the brake fluid, into abutment with a brake drum or a brake disk. In this way, the braking force acting on the wheel connected to the brake drum or brake disk can be metered by activation of the master brake cylinder. The master brake cylinder is generally embodied as a tandem master brake cylinder (tandem master cylinder, TMC) that has two pressure chambers for applying pressure to two independent brake circuits. The two brake circuits can each act on all the wheels of the motor vehicle, but can also be distributed, for example, between the individual wheels in such a way that one of the brake circuits acts on the front wheels and the other on the rear wheels.

The master brake cylinder can be activated by the driver of the motor vehicle using the brake pedal, wherein to boost the braking force a brake booster can be connected to the pressure piston of the master brake cylinder. The brake booster generates, as a function of the activation of the brake pedal, an additional force that acts in the activation direction of the brake pedal, because of which the pressure piston is moved with increased force in the activation direction. The brake booster frequently generates the additional force pneumatically, in particular by means of under pressure, but can also generate said additional force electromechanically, in particular by means of an electric motor that shifts a valve body in the activation direction by means of an actuator gear mechanism.

If the brake pedal is activated and an increased pressure is generated in the pressure chamber or chambers of the master brake cylinder by means of the pressure piston, brake fluid is expelled from the pressure chamber or chambers in order to activate the wheel brake cylinder or cylinders. In the case of a motor vehicle equipped with a braking assistance function, i.e. with an automatic braking function, also referred to as a "braking assistant", an additional increase in brake pressure can take place automatically in certain situations in order to increase the braking forces applied to the wheels, and to shorten the braking distance of the motor vehicle.

Such a situation in which the braking assistance function intervenes may be, for example, a very rapid activation of the brake pedal by the driver during which, however, a brake pressure that is sufficient for full braking is not reached. Owing to the high speed of the activation of the brake pedal, it is to be assumed in this case that the driver will initiate full braking, but does not apply the activation force necessary to bring it about. As a result of the intervention of the braking assistance function, additional brake pressure is generated which is sufficient for full braking, in particular for activation of an anti-lock brake system (ABS).

Another situation in which the "braking assistant" intervenes can occur if the brake booster has reached its maximum force but a still greater degree of deceleration and therefore even higher brake pressure is required. In this case, an increased brake pressure can be generated by intervention of the braking assistance function without the brake pedal feeling hard.

A further situation in which intervention by the braking assistance function is advantageous can occur if the driver of the motor vehicle brakes with a considerable braking deceleration, for example with 3 $m/s^2$, and an automatic detection system detects an obstacle in front of the motor vehicle in the direction of travel, but the braking deceleration selected by the driver may not be sufficient to avoid a collision with the obstacle. In this case, the "braking assistant" can automatically generate a relatively high brake pressure and therefore bring about a greater braking deceleration, with the result that the collision can be avoided or at least attenuated.

A pressure-generating device of an electronic stability control system (Electronic Stability Control, ESC) can bring about an increase in the brake pressure during the intervention of the braking assistance function. If this pressure-generating device is activated, that is to say, for example, a fluid pump for generating pressure operates, this generally brings about a reduction in the pressure in the master brake cylinder, resulting in a reduction in the force applied to the brake pedal by the driver or even in the brake pedal dropping by several centimeters. This behavior of the brake system impedes the sensing of the braking behavior desired by the driver; in particular, it is difficult to determine whether the driver wishes to reduce the braking force or even to end the braking process. Likewise, it is difficult to determine whether the driver wishes even higher braking deceleration. As a result, it is made more difficult, or even impossible, for the driver to control the braking process by means of the force applied to the brake pedal.

SUMMARY OF THE INVENTION

A brake system according to the invention for a motor vehicle having a braking assistance function includes a master brake cylinder activated with a brake pedal by means of a brake booster, as well as a control device. Furthermore, the brake system comprises at least one sensor is designed and arranged to sense a distance between a valve piston of the brake booster and a transmission element, connected to a pressure piston of the master brake cylinder. The control device designed to control the brake system may include a processor. The control device can, in particular, be embodied as part of a control device of the brake system or of the electronic stability control system of the motor vehicle or be identical thereto. As a result, a brake system with an improved operational capability is provided, wherein, in particular, the braking behavior that is desired by the driver can be detected even in the event of an intervention by the braking assistance function.

Within the scope of monitoring of the distance s it is possible to detect reliably release of the brake pedal even when the pressure-generating unit is activated. In addition, despite an active braking assistance function, a consistent interplay can be ensured between the activation by the driver and the assistance-side activation of the brakes given satisfactory pedal feedback.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
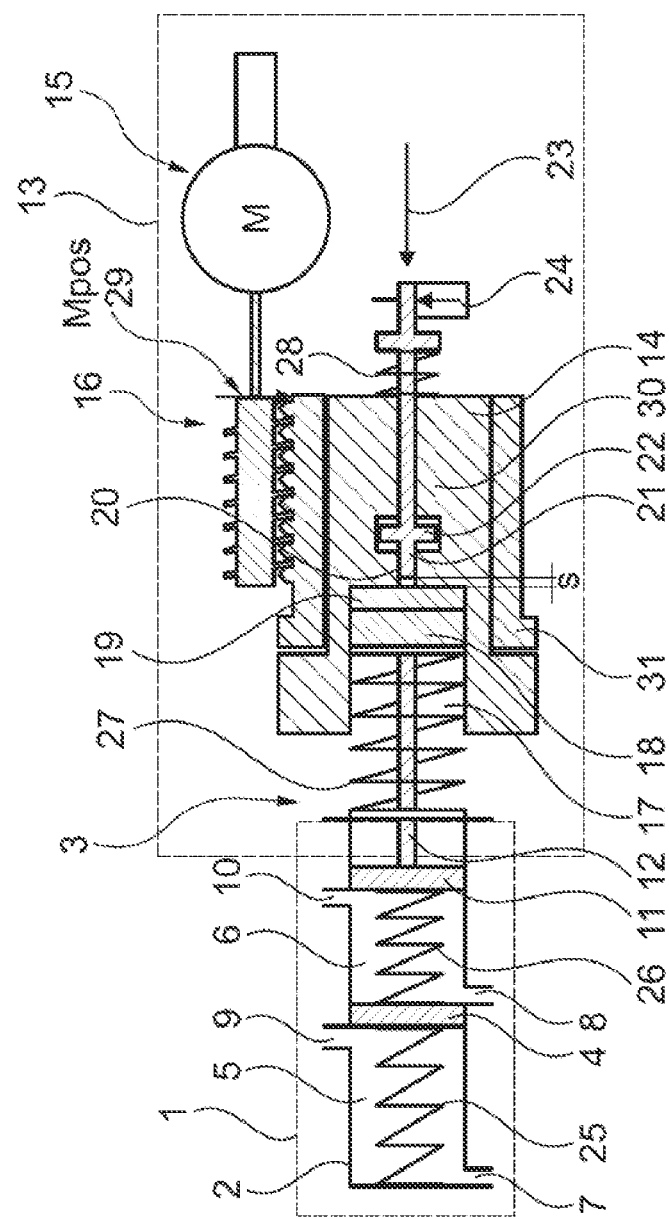
FIG. 1 shows, in schematic form, a brake system according to an exemplary embodiment of the invention.

An exemplary embodiment of an inventive brake system of a motor vehicle, illustrated schematically in FIG. 1, includes a tandem master brake cylinder 1. The master brake cylinder 1 includes a housing 2, a pressure piston 3, and a secondary piston 4. The secondary piston 4 divides the interior of the housing 2 into a first pressure space 5 and a second pressure space 6 connected via pressure connections 7, 8 to a first and a second brake circuit. The brake circuits, which each comprise hydraulic lines for connecting to the wheel brake cylinders of the motor vehicle and, if appropriate, further elements, are not illustrated in FIG. 1. The housing 2 has further connections 9, 10 for connecting to fluid accumulators (not illustrated). The pressure piston 3 includes a pressure plunger 11 and a piston rod 12.

The brake system also includes an electromechanical brake booster 13 having a valve body 14, which can be shifted by an electrically operated drive motor 15 via a worm gear 16 that engages in a suitable worm gear tooth arrangement on a brake booster body 31. The brake booster body 31 bears with a collar against the valve body 14 in the direction of cylinder activation.

The end of the piston rod 12 opposite the pressure plunger 11 is inserted into a first drilled hole 17 in the valve body 14. The end of the piston rod 12 engaging a bearing plate 18 having a reaction disk 19. Guided in a second drilled hole 20, which forms a continuation of the first drilled hole 17 coaxially therewith, is a valve piston 21 having a plate 22 in an extension 30 of the second drilled hole 20. The valve piston 21 is connected directly or via an activation rod to a brake pedal (not illustrated). As is indicated by the arrow 23, activation of the brake pedal shifts the valve piston 21 in the axial direction in the drilled hole 20. The axial position of the valve piston 21 (in absolute terms with respect to the housing (not illustrated) of the brake booster) is sensed by a pedal travel sensor 24.

Activation of the brake pedal shifts the valve piston 21 to the left as shown in FIG. 1. The shifting is sensed by the pedal travel sensor 24, and according to boosting the drive motor 15 is operated to shift, also to the left, the brake booster body 14 via the worm gear 16, wherein the position of the brake booster body being sensed by means of a schematically indicated motor position sensor 29 (MPos).

Both the pedal travel sensor 24 and the motor position sensor 29 can also be arranged at other locations than those illustrated depending on the structural conditions. In addition, the position signals can be derived or combined from other sensor signals or operational parameters. In the case of the motor position sensor 29, it could be possible, for example to sense merely one reference position or zero position of the brake booster body 14 and then derive (not illustrated) the actual current position on the basis of the revolutions of the worm gear—sensed on the basis of activation signals of the drive motor 15 or by means of an incremental signal generator.

When the force applied to the brake pedal or corresponding return-shifting of the valve body 14 is reduced, resetting of the shiftable elements is ensured by the springs 25, 26, 27, 28.

Through the reaction disk 19, a force is applied to the pressure piston 3, and the latter is shifted to the left, with the result that an increased brake pressure is generated in the pressure spaces 5, 6.

One particular property of the illustrated brake booster is that there is no rigid connection between the valve piston 21 and the reaction disk 19. Instead, the valve piston 21 moves with respect to the valve body 14 within certain predefined mechanical limits, inter alia, by the axial extent of the extension 30 in the valve body 14, a position of rest being predefined in the non-activated state, for example on the basis of the effect of a restoring spring 28. This possible relative movement results in a variable distance s between the reaction disk 19 and the valve piston 21. By evaluating this distance, the tendency of the activation of the brake pedal by the driver can be detected and the valve body 14 can be correspondingly moved by motor, wherein at the same time a pedal feedback can be conveyed to the driver by means of the spring 28 and the stops.

As illustrated, the valve body 14 is not permanently connected to the brake booster body 31 but instead bears against the master brake cylinder 31 in the activation direction thereof. In the event the valve piston 21 is activated beyond its mechanical limit within the extension 30, the entire valve body 14 is shifted directly by the valve piston 21 and the brake can therefore be activated even when the drive motor 15 is not reacting or is not reacting adequately.

As a result of the sensing of the absolute position of the valve piston 21 and of the motor position (MPos) via the sensors 24 and 29, the distance s between the reaction disk 19 and the valve piston 21 can be sensed by forming differences while taking into account geometrically conditioned offset values.

If a braking assistance function then intervenes, for example owing to the detection of activation of the brakes at a high speed, an increased brake pressure is made available by a pressure-increasing device. The pressure-generating device can act directly on the brake circuit (not illustrated in FIG. 1), with the result that the increased brake pressure does not act in the pressure spaces 5, 6; owing to an extraction of pressure fluid from the pressure spaces 5, 6 by one or more pumps of the pressure-generating device, the pressure prevailing in the pressure spaces 5, 6 can even drop. However, the brake booster 13 itself can also be used as a pressure-generating device for generating the increased brake pressure in that the drive motor 15 is actuated in order to bring about further adjustment of the valve body 14 to the left.

In the disclosed embodiment, the brake system is controlled as a function of the sensed distance s between the valve piston 21 and the pressure piston 3. If it results from the sensed distance s, for example, that the driver has released the brake pedal and the braking process is therefore to be ended, the pressure-generating device is deactivated, and if the brake booster has been used to generate the increased brake pressure the drive motor 15 is actuated in order to shift the valve body 14 back to the right.

Figure 2:
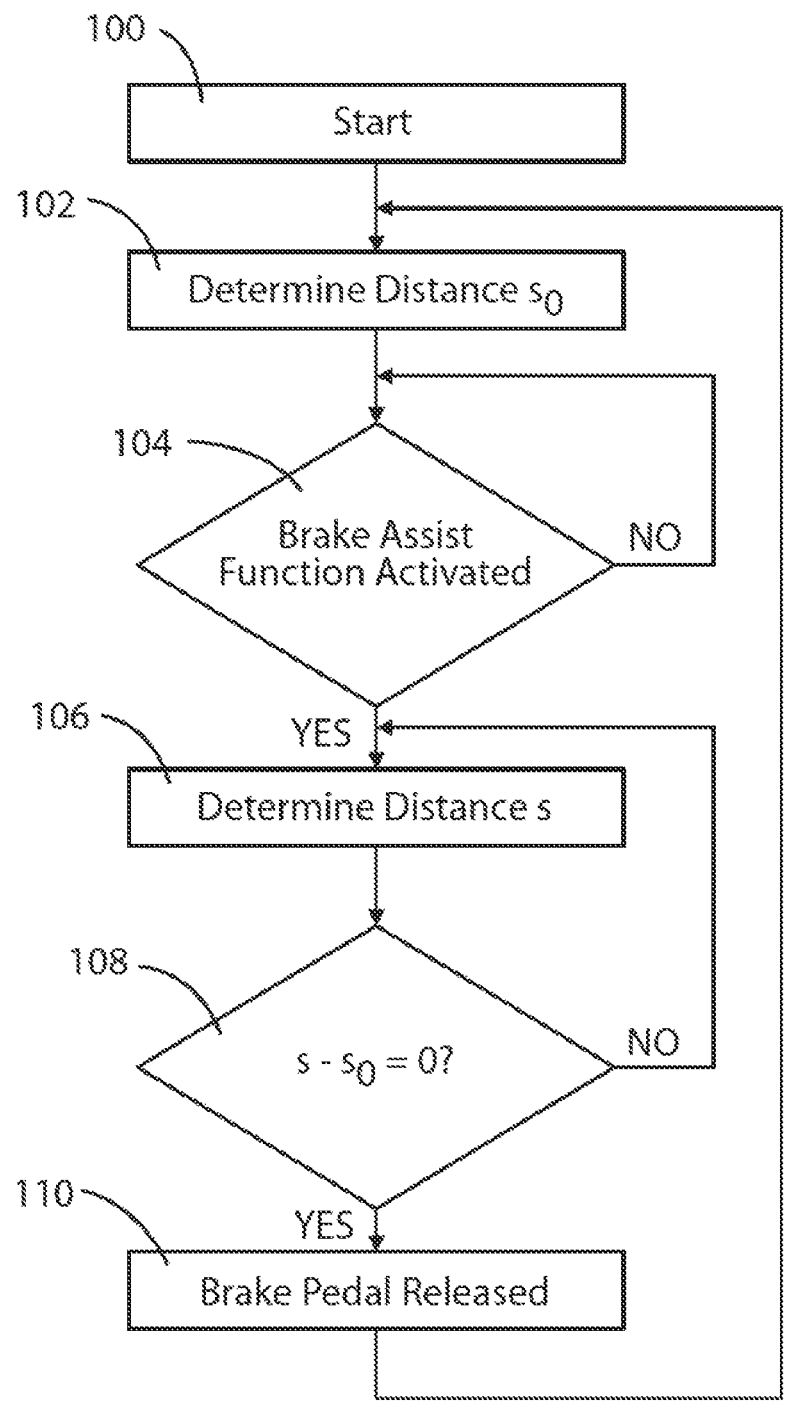
FIG. 2 shows a simplified flowchart of an exemplary embodiment of a control method according to the invention.

FIG. 2 is a simplified illustration as a flowchart of an exemplary embodiment of a control method according to the invention. The method begins in a starting step 100. In the next step 102, before the start of a braking process, the distance $s_0$ between the reaction disk 19 and the valve piston 21 is sensed in the position of rest, i.e. in the non-activated state of the brake pedal. In step 104, it is determined, continuously or in a short timing cycle, whether the brake assistance function is activated, has intervened and correspondingly generated an increased brake pressure. If yes, in step 106 the current value of s, the distance between the reaction disk 19 and the valve piston 21, is sensed with a timing cycle of several milliseconds; for this, the control device reads the corresponding travel sensors and the current distance s is calculated.

In step 108, the distance s is compared with the previously determined distance $s_0$ in the position of rest. In step 110 if the condition $s-s_0=0$ is satisfied, when the brake pedal is released, and under the current conditions in terms of vehicle movement dynamics, the braking assistance function is deactivated and a pressure-generating device of the braking assistance function is switched off, or some other measure is taken which is appropriate. In order to determine whether the specified condition is satisfied, a sign of $(s-s_0)$ can be determined, and in the event of a change in sign it is assumed that the condition was satisfied and the braking assistance function is correspondingly switched off or some other measure which is appropriate when it is detected that the pedal is released is initiated (if appropriate a braking intervention can also be continued).

The brake pressure in the master brake cylinder 1, which is normally used for the release of the pedal, is preferably used at most as an additional criterion for detecting release of the pedal.

According to the exemplary embodiment, the invention relates to a hydraulic brake system of a motor vehicle, the motor vehicle having a braking assistance function. The brake system has a master brake cylinder 1 in fluid communication with at least one wheel brake device activated by brake pressure generated in the master brake cylinder. The master brake cylinder 1 can be embodied, in particular, as a tandem master brake cylinder (TMC) of a dual-circuit brake system, and can have two pressure chambers that are arranged in series and are separated by a secondary piston. An increase in pressure in a wheel brake cylinder of the wheel brake device is brought about by activating the master brake cylinder, whereby, for example, two brake shoes are pressed against a brake disk connected to the respective wheel to apply a braking force to the wheel.

The motor vehicle is also equipped with a braking assistance function. The braking assistance function may intervene in the brake system based on an internal or external request with respect to the brake system, and by using a pressure-increasing device generates an additional increase in the brake pressure acting on at least one wheel brake device. An internal request can be triggered, for example, based on the speed or the attained maximum force of the activation of the brake pedal, or on the brake pressure generated in the master brake cylinder. An external request can be triggered, for example, by a safety or detection system that detects obstacles located in front of the vehicle in the direction of travel, and determines whether a collision may be avoided given the current braking deceleration. The brake system may include an electronic control device that triggers an internal request or receives an external request and correspondingly activates the braking assistance function.

In the disclosed embodiment, the distance s between a valve piston 21, connected to the brake pedal, of the brake booster 13 and a transmission element, connected to the pressure piston 3 of the master brake cylinder 1, is sensed, and the brake system is controlled as a function of the sensed distance s. The distance s having a value different from the initial value so occurring in the non-activated state of the brake pedal. The distance between a plate 22 of the valve piston 21 and the transmission element can also be sensed; since the plate 22 is permanently connected to the valve piston 21, this distance is also referred to below as the distance between the valve piston and the transmission element.

To sense the distance, one or more distance sensors or travel sensors can be arranged, for example, on the brake pedal, on the valve piston, on the pressure piston or on a piston rod or other connecting elements. Given a plurality of travel sensors it is possible to calculate the distance from a difference between the signals of the travel sensors. The sensed distance is, in particular, the current distance between the valve piston 21 and the transmission element.

Because the distance s is ultimately variable (preferably within pre-defined mechanical limits) and is unequal to zero in the non-activated state, there is no rigid coupling between the valve piston 21 and the transmission element. These elements connect with one another in an elastically sprung fashion and can be shifted with respect to one another only within a certain travel window.

With this non-rigid connection, the adjustment travel of a braking-force-boosting electric motor 15 can be additionally impressed on the master brake cylinder 1, the existing "play" being able to allow for the brake pedal activation and permitting a situationally appropriate pedal restoring force to be conveyed to the driver through adaptation of the distance s.

To build up increased brake pressure, the hydraulic brake system may include a pressure-generating device that communicates fluidly with the at least one wheel brake device. In one embodiment the pressure-generating device, for example, includes a pump or a pressure reservoir connected to the master brake cylinder or to at least one brake circuit; however, the brake booster itself can also serve as a pressure-generating device. The pressure-generating device may activate, in particular, as a function of the distance s and operable to generate the increased brake pressure and/or be deactivated as a function of the distance s, with the result that an increase in brake pressure no longer takes place.

Determining the distance s between the valve piston 21 and the transmission element, connected to the pressure piston 3, and controlling the increase in brake pressure of the braking assistance function as a function of the distance s makes it possible for the braking request of the driver to be sensed, even when an intervention by the "braking assistant" takes place enabling the brake system to operate in accordance with the driver's detected request. As a result, the driver can improve the controllability of the braking behavior of the motor vehicle, and adaptation of the behavior of the brake system to different situations can be made possible.

The transmission element whose distance from the valve piston 21 is sensed according to the invention can be, in particular, a reaction disk 19 of the brake booster 13. The reaction disk 19 connects to the pressure piston 3 and bears, for example, against an end plate 18 of a piston rod 12 of the pressure piston 3 on the side directed toward the valve piston 21. Because the reaction disk 19 applies the reaction of the brake system on the brake pedal, the distance of the reaction disk 19 from the valve piston 21 is sensed and used to control the braking assistance function, it is possible to ensure that the reaction sensed by the driver corresponds in a particularly simple way to the braking behavior, in particular to the current braking deceleration. As a result, the operational capability of the brake system is improved further.

According to one embodiment, the current distance between the valve piston 21 and the transmission element connected to the pressure piston 3 is preferably compared with a distance between the valve piston 21 and the pressure piston 3, determined in the case of non-activation of the brake pedal. The state of non-activation of the brake pedal, i.e. when no force is applied to the brake pedal by the driver, is also referred to as the state of rest, and the relative position of the valve piston 21 to the pressure piston 3 is referred to as a position of rest. The distance between the valve piston 21 and the transmission element in the position of rest can be predetermined or newly determined after each braking process. The comparison between the current distance and the distance in the position of rest can take place continuously or at least when the braking assistance function has been activated owing to an internal or external request and the pressure-generating device has been operated in order to generate an increased brake pressure.

If, after the braking assistance function increases brake pressure, the current distance between the valve piston 21 and the transmission element is equal to the distance in the position of rest, the increase in brake pressure is ended. In particular the pressure-generating device, activated by the "braking assistant" to generate the increased brake pressure, is actuated to generate a brake pressure that is not increased in relation to the operation without intervention by the braking assistance function, or the pressure-generating device is switched off and the intervention by the braking assistance function in the brake system is ended. Alternatively, when the distance between the valve piston 21 and the transmission element is equal to the distance in the position of rest, the pressure-generating device and, if appropriate, the brake booster are actuated in such a way that a brake pressure is made available solely by the pressure-generating device, without taking into account activation of the brake pedal by the driver. The satisfaction of the specified condition that the distance between the valve piston 21 and the transmission element is equal to the distance in the position of rest can be detected, for example, by the difference between the current distance and the distance in the position of rest monitored in a tight timing cycle, and when there is a change in sign of the difference it is inferred that the specified condition is satisfied. According to this embodiment of the invention, a faster and more robust buildup of pressure in the brake system is made possible, as is also the reliable detection of release of the brake pedal by the driver, and therefore reliable detection of the driver's request to end the braking process.

The detection of release of the pedal may be the criterion used in conventional brake systems, as opposed to monitoring of the brake pressure in the master brake cylinder. Because the last-mentioned criterion is not sufficiently informative, in particular in the case of operation of a hydraulic pressure-generating device (for example ESC pump) for release of the pedal, since the hydraulic pressure in the master brake cylinder can already drop, even as far as zero, as a result of the activity of the pump. Within the scope of the invention, therefore, the hydraulic pressure is preferably not used to determine the release of the pedal, or only as a criterion in addition to the distance criterion described above. This criterion is valid and can be applied when there is an increase in pressure as a result of use of the brake booster that is activated by electric motor.

According to one preferred embodiment of the invention, the increase in brake pressure generated in the case of an intervention of the braking assistance function is generated by means of a pressure-generating device of an electronic stability control system (Electronic Stability Control, ESC). This has the advantage that the elements of the electronic stability control system, which is present in many motor vehicles, can be used for the increase in the brake pressure which is brought about by the braking assistance function.

Alternatively or additionally, there may be provision that the increase in brake pressure brought about by the braking assistance function is generated by the brake booster. This has the advantage that in principle there is no need for any additional elements for the generation of the increased brake pressure. The brake booster can be operated pneumatically or electromechanically.

If the increase in brake pressure is brought about by the braking assistance function being at least partially generated by hydraulic braking force boosting by means of the pressure-generating device (for example by means of the ESC pump), it is preferred that a change over time in the distance between the valve piston 21 and the transmission element is sensed. After an increase in brake pressure is brought about by the braking assistance function, an increase in the sensed distance between the valve piston 21 and the transmission element is detected, the brake booster is actuated to increase the brake pressure further. In particular, the difference between the distance between the valve piston 21 and the transmission element in the position of rest and the current distance can be monitored. This difference normally increases when the braking assistance function intervenes. If a decrease is detected, the brake booster is operated to increase the brake pressure further. As a result, in the event of an intervention by the braking assistance function it is made possible for it to be detected if the driver wishes greater deceleration than is made available because of the intervention by the braking assistance function, permitting better control of the braking process for the driver.

The procedure is particularly advantageous in the case of an electromechanical brake booster. In this case, when, after an intervention by the braking assistance function, an increase over time in the distance between the valve piston 21 and the transmission element or a decrease in the difference between the distance in the position of rest and the current distance is detected, the drive motor of the brake booster is operated in such a way that the adjustment travel of the valve body 14 corresponds to an equally large shift during a braking process without intervention by the braking assistance function. As a result, a continuous transfer of the control of the braking process to the driver is made possible after an intervention by the braking assist, thereby further improving the operational capability of the brake system.

In the event of a decrease in the difference between the distance in the position of rest and the current distance being detected, the drive motor of an electromechanical brake booster is operated with a speed which is reduced compared to normal operation, i.e. without intervention by the braking assistance function, in particular with a speed which is reduced by approximately 10% to approximately 40%, preferably approximately 20%.

As a result, a particularly favorable force reaction on the brake pedal can be achieved which further improves the operational capability of the brake system. In particular, this can prevent the brake pedal being able to be easily depressed in the event of an intervention by the braking assistance function, without the driver being able to bring about an increased braking effect by increasing the force applied to the brake pedal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling a hydraulic brake system comprising:
   providing a master brake cylinder having a pressure piston and a reaction disk engaging the pressure piston;
   providing a valve body, said valve body contacting said reaction disk and a valve piston, said valve piston moving independent of and relative to said valve body, said valve piston continually separated and spaced from said reaction disk at some distance s wherein the distance s is sensed, said valve piston engaging said reaction disk only through said valve body;
   wherein activation of a brake assist system changes the distance s to a value different from an initial value $s_0$ occurring in a non-activated state of the brake pedal; and
   controlling brake pressure in the brake system as a function of the sensed distance s and initial value $s_0$.

2. The method of claim 1 including the steps of:
   determining the distance $s_0$ between the valve piston and the reaction disk in the non-activated state of the brake pedal;
   comparing the current distance s between the valve piston and the reaction disk with the distance $s_0$; and
   when the condition $s-s_0=0$ applies, a released brake pedal is inferred.

3. The method of claim 1 wherein the step of activating a brake assist system includes an increase in brake pressure by a pressure-generating device of an electronic stability control system (ESC).

4. The method of claim 1 wherein the step of activating a brake assist system includes an increase in brake pressure by a brake booster.

5. The method of claim 1 including the steps of:
   determining when the step of activating a brake assist system brings about an increase in pressure;
   sensing a change in the distance s over time; and
   actuating a brake booster to increase brake pressure in the event of an increase in the distance s.

6. The method of claim 1 including the steps of:
   determining whether a brake assistance function is activated;
   when a brake assistance function is activated determining whether the distance s changes over time;
   operating a brake booster to increase brake pressure; and
   operating the brake booster in a manner corresponding to the change in distance s.

7. The method of claim 6 including the steps of:
   determining whether the distance s is greater than or less than the distance $s_0$;
   operating the brake booster at a predetermined rate when the distance s is greater than the distance $s_0$; and
   when the distance s is less than the distance $s_0$ operating the brake booster at a rate less than the rate of operation of the brake booster when the distance s is greater than the distance $s_0$.

8. The method of claim 7 wherein when the distance s is less than the distance $s_0$ the rate of operation of brake booster is reduced by approximately 20%.

9. A method for controlling a hydraulic brake system of a motor vehicle having a braking assistance function comprising:
   providing a master brake cylinder having a pressure piston and a transmission element connected to the pressure piston;
   providing a brake booster having a valve piston and a valve body, said valve body engaging said transmission element;
   providing a continuous and uninterrupted space extending from said valve piston to said transmission element wherein said valve piston is continually separated and spaced from said transmission element at some distance s apart from one another;
   determining a distance $s_0$ between the valve piston and the transmission element;
   comparing the distance s between the valve piston and the transmission element with the distance $s_0$; and
   moving said valve body of said brake booster to increase brake pressure corresponding to the comparison between the distance s and the distance $s_0$ wherein the brake system is controlled as a function of the sensed distance s.

10. The method of claim 9 including the step of determining whether a brake assist function is activated.

11. The method of claim 9 including the steps of:
    determining whether a brake assistance function is activated;
    when a brake assistance function is activated determining whether the distance s changes over time;
    determining whether the distance s is greater than or less than the distance $s_0$;
    operating the brake booster at a predetermined rate when the distance s is greater than the distance $s_0$; and
    when the distance s is less than the distance $s_0$ operating the brake booster at a rate less than the rate of operation of the brake booster when the distance s is greater than the distance $s_0$.

12. The method of claim 9 wherein when the distance s is less than the distance $s_0$ the rate of operation of brake booster is reduced by an amount greater than 10%.

13. The method of claim 9 including the steps of:
    providing a brake booster body engaging said valve body;
    providing a drive motor, said drive motor engaging said brake booster body;
    actuating said drive motor to move said valve body and correspondingly increase said brake pressure.

14. A hydraulic brake system comprising:
    a master brake cylinder including a pressure piston;
    a brake booster including a valve body and a valve piston;
    a transmission element disposed between said valve body and said pressure piston;

an uninterrupted space extending at a distance s from said transmission element to said valve piston; and at least one sensor for sensing the distance s.

15. A hydraulic brake system as set forth in claim 14 including:

a brake booster body engaging said valve body; and a drive member, said drive member engaging said brake booster body and operative to move said brake booster body and correspondingly said valve body.

* * * * *